United States Patent Office 3,218,291
Patented Nov. 16, 1965

3,218,291
RUBBER COMPOSITIONS STABILIZED WITH
THIOETHERS OF PHENOLS
Charles Edwin Kendall, Coleshill, and Douglas Wynne
Huke, Walmley, Sutton Coldfield, England, assignors to
Dunlop Rubber Company Limited, a British company
No Drawing. Filed Sept. 11, 1961, Ser. No. 137,059
Claims priority, application Great Britain,
Sept. 29, 1960, 33,390/60
7 Claims. (Cl. 260—45.9)

This invention relates to improvements in and relating to rubber compositions.

Vulcanized rubber compositons are known to be susceptible to attack by ozone and oxygen present in the atmosphere and also to be subject to cracking when flexed. The sidewall regions of pneumatic tyres which undergo a large degree of flexing are particularly susceptible to cracking and when such cracks are formed this weakens the sidewall regions and often leads to premature failure of the tyre. Organic chemicals are known which prevent to some degree this tendency to crack when flexed, but, however, the chemicals often discolour the rubber composition, and also do not confer thereto sufficient resistance to cracking. Therefore, there is a need for a chemical compound which when incorporated in a rubber composition will reduce the tendency of the vulcanized composition to be subject to flex-cracking and for a compound which does not stain or otherwise bring about discoloration of the rubber composition.

According to the present invention a vulcanized rubber composition which possesses a high resistance to cracking when flexed comprises natural or synthetic rubber in admixture with an organic compound having the general formula, RS—$C_6H_4$—OH in which R represents an alkyl, alkenyl, alicyclic or aralkyl hydrocarbon group.

Preferably, the vulcanized rubber composition in addition contains an antiozonant which does not bring about discoloration of the rubber composition. Such an antiozonant is a thiourea containing one or more alkyl, alkenyl, aralkyl or alicyclic hydrocarbon substituents in the molecule. The use of such thioureas as antiozonants is claimed and described in our British Patent 887,174. The antiozonants can be used in conjunction with a carrier substance which increases the concentration of the antiozonant at the surface of the vulcanized rubber composition and said carrier substances are described and claimed in our British Patent 887,173. Examples of suitable carrier substances are metal soaps of fatty acids, liquid organic polysulphides and polyethylene oxide condensation products.

The organic compounds having the above general formula which will be referred to hereinafter as antiflex-cracking agents, are mercapto-mono-hydroxy-phenols in which the mercapto-substituent contains an alkyl, alkenyl, alicyclic or aralkyl hydrocarbon group. Preferably, the compound is a para-alkyl-mercapto-phenol, e.g. p-hydroxy-phenyl-ethyl sulphide, p-hydroxy-phenyl-n-butyl sulphide or p-hydroxy-phenyl-n-octyl sulphide. However, hydroxy phenols substituted by a mercapto group either in the ortho- or meta-position with respect to the hydroxy group can also be used. A typical compound of this type is m-hydroxy-phenyl-ethyl sulphide. Similarly, antiflex-cracking agents can be used in which the alkyl group is replaced by an alkenyl, alicyclic or aralkyl group, e.g. an ethylene, cyclohexyl or benzyl group.

The antiflex-cracking agents can be used to prevent or substantially reduce the tendency for flex-cracking in vulcanized natural or synthetic rubber compositions. The compositions are prepared in the normal manner by mixing the rubber on an open mill or in an internal mixer with the antiflex-cracking agent, antiozonants if desired, and vulcanizing ingredients such as sulphur and accelerators. Other ingredients such as fillers, extender oils, scorch retarders, and antioxidants can also be mixed with the rubber compositions. The composition so obtained is then formed into the desired shape, for example, by extruding or moulding, and vulcanized. Preferably, the antiflex-cracking agents are used in an amount of 0.4 to 5 parts per 100 parts of rubber.

Vulcanizing the composition is usually carried out by heating at a temperature of from 250° F. to 350° F. for a sufficient length of time until the physical properties of the vulcanized composition are at at an optimum.

All types of synthetic rubber can be used to prepare the rubber composition, and examples of these are polybutadiene, polyisoprene, polychloroprene, polyisobutylene and copolymers of butadiene with styrene, acrylonitrile or methyl isopropenyl ketone.

The novel compositions have many uses and are of particular use as articles or parts of articles which are subject to flexing. For instance, white tyre sidewalls have an improved resistance to flex-cracking and also are not stained appreciably when they are manufactured from such compositions. Boots, conveyor belts and hose can all be advantageously manufactured from the compositions.

In addition to acting as antiflex-cracking agents the organic compounds specified above have the additional advantage of not discolouring rubber compositions when these are subject to sunlight. Hitherto, antiflex-cracking agents have had a tendency to cause discoloration in the rubber compositions when exposed to sunlight and thus could not be used when a rubber composition having a white or light colour was desired. The use of the present antiflex-cracking agents in conjunction with the antiozonants referred to hereinbefore enables compositions to be obtained which retain their attractive appearance and which resist both ozone cracking and flex-cracking.

The invention is illustrated in the following examples in which all parts are given by weight:

EXAMPLE I

Three samples of rubber composition were prepared from the following basic ingredients:

| | Part(s) by weight |
|---|---|
| Natural rubber | 100 |
| Sulphur | 2 |
| Mercaptobenzthiazole | 0.5 |
| Mercaptobenzthiazyl disulphide | 0.5 |
| Tetramethyl thiuram disulphide | 0.1 |
| Stearic acid | 0.5 |
| Zinc oxide | 85 |
| Titanium dioxide | 18 |
| Antiflex-cracking agent (see below) | 1 |

One of the samples contained no antiflex-cracking agent and acted as the control while the remaining two samples were prepared using p-hydroxy-phenyl-ethyl sulphide and m-hydroxy-phenyl-ethyl sulphide respectively. The samples were vulcanized in the form of test-pieces at 258° F. for 40 minutes.

A small cut or V-shaped notch was then cut in each of the test-pieces and these were then flexed on a Gerke-Ranier machine through an angle of 0 to 70 degrees at a rate of 300 cycles per minute. The rate of cut growth of the samples was then measured by determining the increased depth of the notch after a certain period of time. Also the resilience of other test-pieces of the samples was determined on a Trypsometer. The results are shown in the following table:

*Table I*

| Antiflex-cracking agent | Resilience | Cut growth (mm./hour) |
|---|---|---|
| None | 91.0 | 0.55 |
| p-Hydroxy-phenyl-ethyl sulphide | 90.0 | 0.17 |
| m-Hydroxy-phenyl-ethyl sulphide | 90.0 | 0.31 |

The resilience figures show that no modification of the vulcanization conditions are required.

Samples of the three compositions were then exposed to ultra-violet light emitted from a medium pressure mercury arc lamp with a layer of pyrene glass 1 mm. in thickness inserted between the lamp and samples to absorb radiation having a wave-length below 320 millimicrons. The samples were placed 18 inches from the lamp. After being exposed for 24 hours to the radiation the samples containing the antiflex-cracking agent were practically indistinguishable from the control in colour. All the samples had a very slight yellow colour as opposed to the original white colour.

It is quite clear from the above results that the incorporation of the novel antiflex-cracking agents does substantially reduce flex-cracking as measured by the rate of cut-growth and also that the compositions containing these agents are not substantially discoloured.

EXAMPLE II

Four samples of rubber were prepared from the basic ingredients quoted in Example I. One of the samples did not contain any antiflex-cracking agent and the remaining three samples contained one part of p-hydroxy-phenyl-ethyl sulphide, p-hydroxy-phenyl-n-butyl sulphide and p-hydroxy-phenyl-n-octyl sulphide respectively. The four samples were vulcanized and tested as described in the preceding example and the results are given in the following table:

*Table II*

| Antiflex-cracking agent | Resilience | Cut-growth (mm./hour) |
|---|---|---|
| None | 90.0 | 0.49 |
| p-Hydroxy-phenyl-ethyl sulphide | 90.0 | 0.19 |
| p-Hydroxy-phenyl-n-butyl sulphide | 90.0 | 0.19 |
| p-Hydroxy-phenyl-n-octyl sulphide | 89.6 | 0.18 |

These samples also were not substantially discoloured when irradiated with ultra-violet light.

EXAMPLE III

Three samples of rubber compositions were prepared from the basic ingredients quoted in Example I. The samples contained 1 part of p-hydroxy-phenyl-ethyl sulphide, p-hydroxy-phenyl-n-butyl sulphide, and p-hydroxy-phenyl-n-octyl sulphide, respectively. In addition, 2 parts of tributyl-thiourea were added to each of the rubber compositions. The samples were vulcanized in the form of test-pieces at 258° F. for 40 minutes. The rate of cut-growth of each sample was determined and the results are shown in the following table:

*Table III*

| Antiflex-cracking agent | Cut-growth (mm./hour) |
|---|---|
| p-Hydroxy-phenyl-ethyl sulphide | 0.20 |
| p-Hydroxy-phenyl-n-butyl sulphide | 0.22 |
| p-Hydroxy-phenyl-n-octyl sulphide | 0.19 |

The results show that the incorporation of tributyl-thiourea does not materially affect the rate of cut-growth.

Samples of the rubber composition were also flexed on a dynamic outdoor exposure machine at a rate of 1,040 cycles per minute.

A sample of the rubber composition containing tributyl-thiourea but without alkyl mercaptophenol showed no fine ozone cracks but developed deep flex cracks and failed after three days. Other samples containing alkyl mercaptophenol but no tributyl-thiourea developed fine ozone cracks more slowly than a control containing no tributyl-thiourea and no alkyl mercaptophenol, and deep flex cracks appeared after 6 days. Samples containing both tributyl-thiourea and an alkyl mercaptophenol did not develop any fine cracks during the period of the test and flex cracks appeared only after 7 days.

Thus, the alkyl mercaptophenols greatly delay the onset of flex-cracking either in the presence or absence of the thiourea and also offer some protection against ozone cracking, but it is preferred to use the alkyl mercaptophenols in conjunction with a specific antiozonant.

We claim:

1. A vulcanized rubber composition which possesses a high resistance to cracking when flexed, which comprises a vulcanized rubber selected from the class of rubbers consisting of natural rubber, polybutadiene, synthetic polyisoprene, polychloroprene, copolymers of butadiene with styrene, copolymers of butadiene with acrylonitrile, and copolymers of butadiene with methylisopropenyl ketone, in admixture with an organic compound having the general formula $RSC_6H_4OH$ in which R represents a group selected from the class consisting of alkyl groups, alkenyl groups, alicyclic groups and aralkyl groups, said organic compound being present in an amount of from 0.4 to 5 parts by weight per 100 parts by weight of vulcanized rubber.

2. A vulcanized rubber composition which possesses a high resistance to cracking when flexed, which comprises a vulcanized rubber selected from the class of rubbers consisting of natural rubber, polybutadiene, synthetic polyisoprene, polychloroprene, copolymers of butadiene with styrene, copolymers of butadiene with acrylonitrile, and copolymers of butadiene with methylisopropenyl ketone, having admixed therewith an organic compound having the general formula $RSC_6H_4OH$ in which R represents a group selected from the class consisting of alkyl groups, alkenyl groups, alicyclic groups and aralkyl groups, said compound being present in an amount of from 0.4 to 5 parts by weight per 100 parts by weight of vulcanized rubber, and as an antiozonant, a thiourea containing at least one substituent selected from the group consisting of alkyl substituents, alkenyl substituents, alicyclic substituents, aralkyl substituents and combinations of the same.

3. A vulcanized rubber composition as set forth in claim 1 in which the organic compound is hydroxyphenyl-ethylsulphide.

4. A vulcanized rubber composition as set forth in claim 1 in which the organic compound is p-hydroxy-phenyl-n-butylsulphide.

5. A vulcanized rubber composition as set forth in claim 1 in which the organic compound is p-hydroxyphenyl-n-octyl sulphide.

6. A vulcanized rubber composition according to claim 1 wherein said RS substituent of said organic compound is positioned para- with respect to the —OH substituent of said compound.

7. A vulcanized rubber composition according to claim 1 wherein said RS substituent of said organic compound is positioned meta- with respect to the —OH substituent of said compound.

References Cited by the Examiner

UNITED STATES PATENTS

| | | | |
|---|---|---|---|
| 2,244,021 | 6/1941 | Rosen et al. | 260—45.95 |
| 2,477,872 | 8/1949 | Haury | 260—45.9 |
| 2,549,118 | 4/1951 | Newby | 260—810 |
| 2,583,370 | 1/1952 | Guppel et al. | 260—45.9 |
| 3,024,218 | 3/1962 | Stevens | 260—45.9 |
| 3,062,779 | 11/1962 | de Hilster | 260—45.9 |

LEON J. BERCOVITZ, *Primary Examiner.*

MILTON STERMAN, WILLIAM SHORT, *Examiners.*